US012798521B2

(12) United States Patent
Yanai et al.

(10) Patent No.: US 12,798,521 B2
(45) Date of Patent: Nov. 17, 2026

(54) CONSTRUCTION MACHINE

(71) Applicant: HITACHI CONSTRUCTION MACHINERY TIERRA CO., LTD., Koka (JP)

(72) Inventors: Yosuke Yanai, Yasu (JP); Tatsunori Usui, Koka (JP); Daisuke Yamamoto, Koka (JP); Akito Tsukaguchi, Koka (JP)

(73) Assignee: HITACHI CONSTRUCTION MACHINERY TIERRA CO., LTD., Koka (JP)

( * ) Notice: Subject to any disclaimer, the term of this patent is extended or adjusted under 35 U.S.C. 154(b) by 310 days.

(21) Appl. No.: 18/690,836

(22) PCT Filed: Feb. 23, 2023

(86) PCT No.: PCT/JP2023/006608
§ 371 (c)(1),
(2) Date: Mar. 11, 2024

(87) PCT Pub. No.: WO2023/189047
PCT Pub. Date: Oct. 5, 2023

(65) Prior Publication Data

US 2024/0400002 A1 Dec. 5, 2024

(30) Foreign Application Priority Data

Mar. 31, 2022 (JP) ................................ 2022-059882

(51) Int. Cl.
*B60S 1/50* (2006.01)
*E02F 9/08* (2006.01)

(52) U.S. Cl.
CPC ............. *B60S 1/50* (2013.01); *E02F 9/0883* (2013.01); *B60Y 2200/412* (2013.01)

(58) Field of Classification Search
CPC ..... B60S 1/50; B60Y 2200/412; E02F 9/0883
(Continued)

(56) References Cited

U.S. PATENT DOCUMENTS 4,161,287 A * 7/1979 Brown ...................... B60S 1/48 239/284.1
4,832,193 A * 5/1989 Kime ....................... A45C 7/00 206/315.11
(Continued)

FOREIGN PATENT DOCUMENTS

AT 9301455 A * 8/1994
DE 20006048 U1 * 6/2000 ............ B60R 7/087
(Continued)

OTHER PUBLICATIONS

International Search Report of PCT/JP2023/006608 dated Mar. 28, 2023.
(Continued)

*Primary Examiner* — Hilary L Gutman
(74) *Attorney, Agent, or Firm* — MATTINGLY & MALUR, PC

(57) ABSTRACT

A washer tank (18) storing a washer liquid to be supplied to a front ejection device (16) and a rear ejection device (17) is composed of a transparent or translucent container and includes an inclined surface (19A) that inclines from a bottom surface (19D) to a top surface (19C) of a first container part (19). Therefore, as the height of a liquid level (L1, L2) of a washer liquid varies in the washer tank (18), a front end edge (P1, P2) of the liquid level (L1, L2) moves in the front-rear direction along the inclined surface (19A). This mechanism allows an operator to confirm a remaining amount (E1, E2) of the washer liquid only by checking the
(Continued)

position of the front end edge (P1, P2) of the liquid level (L1, L2) shown on the inclined surface (19A) of the first container part (19) from above.

2 Claims, 11 Drawing Sheets

(58) Field of Classification Search
USPC ........................................................ 296/96.15
See application file for complete search history.

(56) References Cited

U.S. PATENT DOCUMENTS

| | | | | | |
|---|---|---|---|---|---|
| 4,846,346 | A * | 7/1989 | Kime | A45C 5/00 | 206/315.11 |
| 4,926,762 | A * | 5/1990 | Paul | B60R 7/087 | 109/51 |
| 2007/0131262 | A1* | 6/2007 | Ishii | B62D 33/0617 | 134/123 |
| 2015/0191896 | A1* | 7/2015 | Voss | E02F 9/0883 | 280/834 |
| 2025/0313155 | A1* | 10/2025 | Hirakawa | B60R 5/02 | |
| 2025/0368031 | A1* | 12/2025 | Kim | B60K 15/063 | |

FOREIGN PATENT DOCUMENTS

| | | | | | |
|---|---|---|---|---|---|
| EP | 0042214 | A2 | | 12/1981 | |
| EP | 0943739 | A2 | * | 9/1999 | E02F 3/325 |
| EP | 1 722 038 | A1 | | 11/2006 | |
| EP | 3 434 829 | A1 | | 1/2019 | |
| FR | 2970223 | A1 | * | 7/2012 | B60S 1/50 |
| JP | 59-165337 | U1 | | 11/1984 | |
| JP | 2-5372 | | | 1/1990 | |
| JP | 3-121022 | U1 | | 12/1991 | |
| JP | 2004-217164 | A | | 8/2004 | |
| JP | 2004-338436 | A | | 12/2004 | |
| JP | 2004-359274 | A | | 12/2004 | |
| JP | 2005-239043 | A | | 9/2005 | |
| JP | 2005238999 | A | * | 9/2005 | B62D 33/0633 |
| JP | 2009029163 | A | * | 2/2009 | |
| JP | 2019-142116 | A | | 8/2019 | |
| JP | 2019-143506 | A | | 8/2019 | |
| JP | 2002-174122 | A | | 6/2022 | |
| KR | 19980050699 | U | * | 10/1998 | G01F 23/02 |

OTHER PUBLICATIONS

Extended European Search Report received in corresponding European Application No. 23779077.9 dated Jan. 26, 2026.
Chinese Office Action received in corresponding Chinese Application No. 202380013359.X dated Mar. 25, 2026.

* cited by examiner

CONSTRUCTION MACHINE

TECHNICAL FIELD

The present disclosure relates to a construction machine with a cab for an on-board operator such as a hydraulic excavator and a wheel loader, for example.

BACKGROUND ART

A hydraulic excavator serving as a representative type of construction machine is configured to include a self-propelled lower traveling structure, an upper revolving structure provided rotatably on the lower traveling structure, and a working mechanism provided rotatably on a front side of the upper revolving structure. A cab for an on-board operator is provided in the upper revolving structure that constitutes a vehicle body.

The cab includes a cab box in the form of a box composed of a front surface portion, a rear surface portion, a left surface portion, a right surface portion and a top surface portion so as to cover an operator's seat. A window for an operator to view a nearby area is provided at the front surface portion, the rear surface portion, the left surface portion, and the right surface portion of the cab box.

Herein, work sites are wasteland, typically scattered with dust or muddy water once a hydraulic excavator is in operation. Thus, a wiper device removing water drops attached on a window (window glass) and an ejection device spurting a washer liquid onto the window are provided at the front surface portion and the rear surface portion of the cab, for example. Also, a washer tank storing a washer liquid to be supplied to the ejection device is provided in the cab (Patent Document 1).

Such a washer tank is formed as a rectangular parallelepiped-shaped container, for example. In this case, the remaining amount of the washer liquid can be checked by visually confirming the washer tank formed of a transparent or translucent resin material in the lateral direction.

PRIOR ART DOCUMENT

Patent Document

Patent Document 1: Japanese Unexamined Utility Model Application Publication No. 2-5372 A

SUMMARY OF THE INVENTION

In fact, an inventive washer tank as disclosed in Patent Document 1 can be visually confirmed in the lateral direction to check the remaining amount of a washer liquid (liquid level position). However, a cab of a hydraulic excavator is defined as a narrow space for an operator just to manipulate the hydraulic excavator. In particular, a small hydraulic excavator, referred to as "mini-excavator", is configured to allow a cab box to surround an operator's seat, control levers, switches, a monitor, and the like.

A cab of a small hydraulic excavator has a limited space installing a washer tank. Thus, a washer tank may be disposed in a work site where it is surrounded by a cab box and other articles and it cannot be visually confirmed in the lateral direction. In this case, the remaining amount of a washer liquid in the washer tank cannot readily be checked.

Herein, since a hydraulic excavator as described above is often operated in wasteland scattered with dust and muddy water, it frequently uses a wiper device and a washer liquid to secure the view. Therefore, when an operation starts with an insufficient remaining amount of a washer liquid and the washer liquid subsequently runs out during the operation, the operation must be stopped to fill (supplement) a washer liquid, resulting in reduced working efficiency. A washer liquid cannot readily be prepared, depending on a work site, so that it may be difficult to provide good visibility.

Further, a washer liquid filling operation can cause overflow if it is difficult to check the remaining amount of the washer liquid (liquid level position), and overflow occurrence inevitably leads to a cleaning operation and failures in the electric system.

In view of the above-described problems of conventional technologies, an object of the present invention is to provide a construction machine capable of readily checking the remaining amount of a washer liquid in a washer tank.

A construction machine according to the present invention includes a self-propelled vehicle body and a cab provided on the vehicle body and having a window, the cab including an ejection device spurting a washer liquid onto the window and a washer tank storing a washer liquid to be supplied to the ejection device, characterized in that the washer tank is composed of a transparent or translucent container and includes an inclined surface that inclines from a bottom surface to a top surface.

According to the present invention, an operator can readily check the remaining amount of a washer liquid in a washer tank even when the washer tank is disposed in a work site where the washer liquid level cannot be visually confirmed in the lateral direction.

MODE FOR CARRYING OUT THE INVENTION

A construction machine according to an embodiment of the present invention, by taking the case of a crawler-type hydraulic excavator, will be explained in detail with reference to FIGS. 1 to 11. In the embodiment, a working mechanism side and a counterweight side are defined as a front side and a rear side, respectively, to define a width direction that is perpendicular to the front-rear direction as the right-and-left direction.

Figure 1:
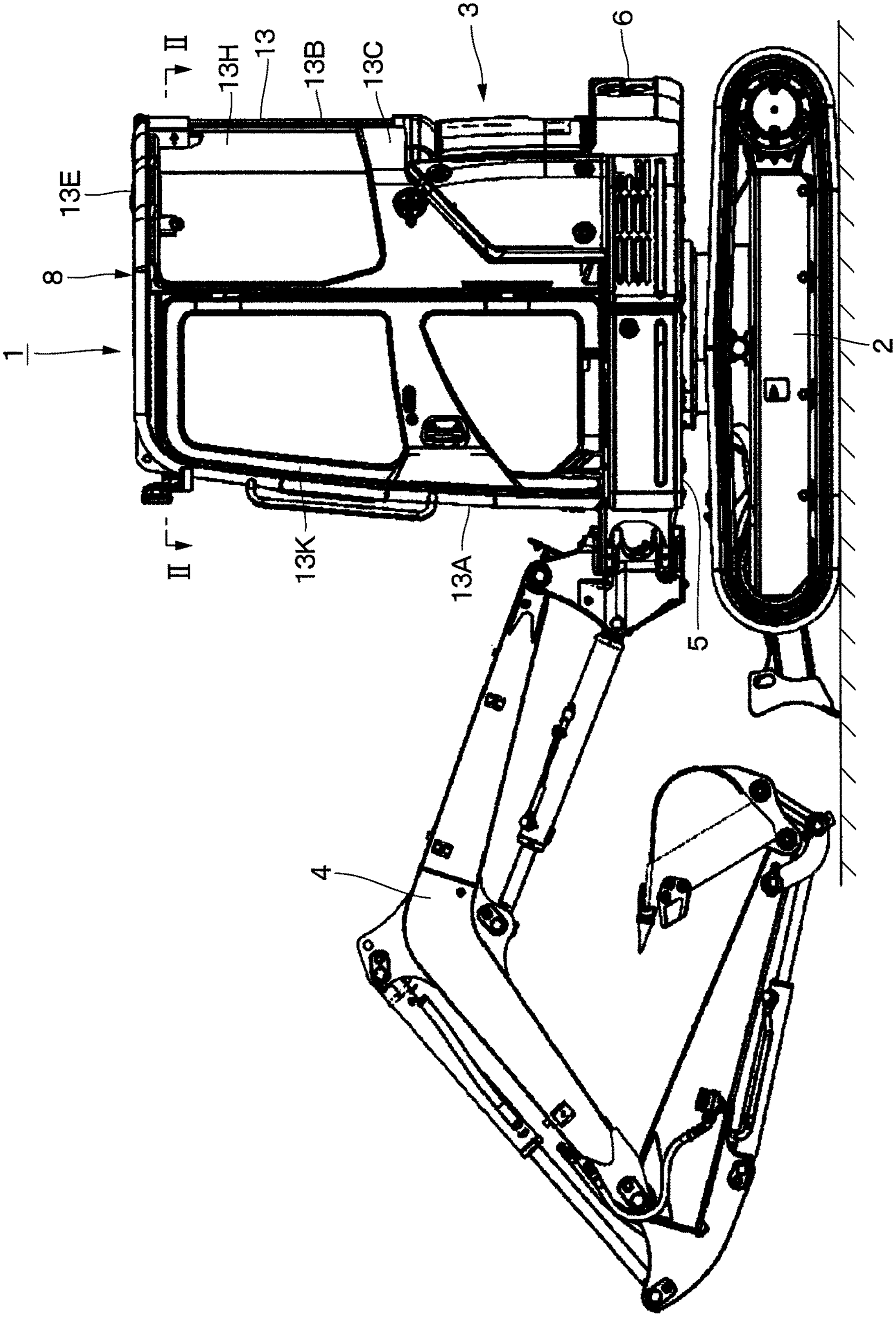
FIG. 1 is a left side view of a hydraulic excavator according to one embodiment of the present invention.

In FIG. 1, a hydraulic excavator 1 serving as a construction machine is configured to include a self-propelled lower traveling structure 2, an upper revolving structure 3 provided rotatably on the lower traveling structure 2, and a swing-type working mechanism 4 provided rotatably on a front side of the upper revolving structure 3. The lower traveling structure 2 and the upper revolving structure 3 constitute a vehicle body of the hydraulic excavator 1. The working mechanism 4 is manipulated by an operator to perform excavating work of sand and earth. Herein, the hydraulic excavator 1 according to this embodiment is a small hydraulic excavator referred to as a mini-excavator and a small cab 8 is provided in the upper revolving structure 3.

The upper revolving structure 3 has a later-described revolving frame 5 that constitutes a base. A counterweight 6, the cab 8 and the like are provided on the revolving frame 5 of the upper revolving structure 3.

The revolving frame 5 is formed as a support structure and mounted rotatably on the lower traveling structure 2. The working mechanism 4 swingably in the right-and-left direction is mounted to a front portion of the revolving frame 5. The counterweight 6 taking a weight balance with the working device 4 is provided on a rear side of the revolving frame 5. A cover member 7 is provided on the right side of the revolving frame 5 so as to cover a hydraulic oil tank, a fuel tank, and the like (each not shown). Further, an engine (diesel engine) as a prime mover, a heat exchanger, and a hydraulic pump (each not shown) are provided on the rear side of the revolving frame 5. The prime mover used may be a hybrid type prime mover composed of a diesel engine and an electric motor combined or a single electric motor.

Figure 2:
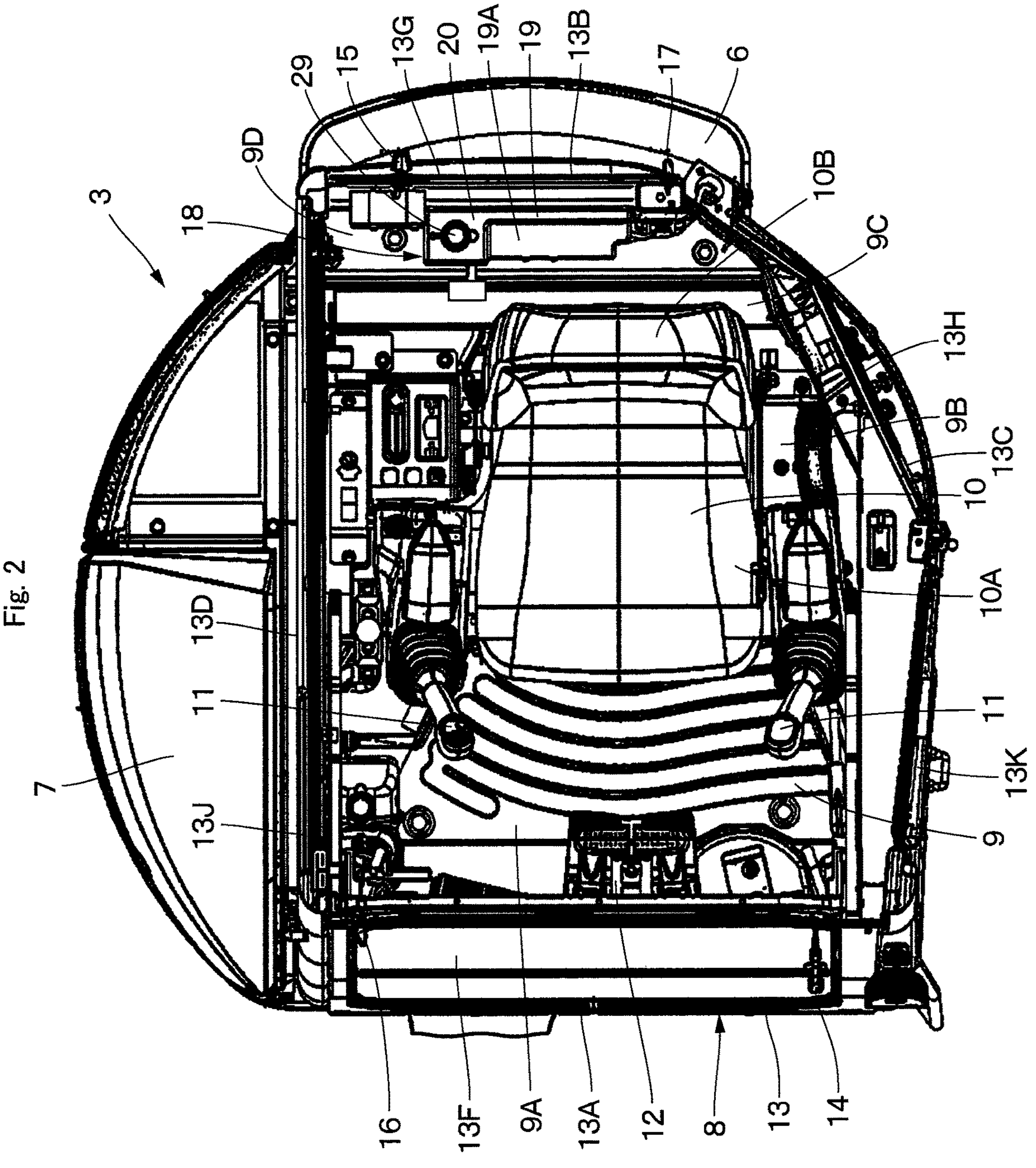
FIG. 2 is a cross-sectional view of an upper revolving structure taken from arrow II-II of FIG. 1.

The cab 8 is provided from the center to the left side in the right-and-left direction of the upper revolving structure 3. As shown in FIG. 2, the cab 8 is configured to include a later-described floor member 9, an operator's seat 10, a cab box 13, a front wiper device 14, a rear wiper device 15, a front ejection device 16, a rear ejection device 17, and a washer tank 18.

A floor member 9 constitutes a base of the cab 8. The floor member 9 includes a flat foot placing portion 9A disposed on a front side thereof, an operator's seat stand 9B that rises up stepwise from a rear side of the foot placing portion 9A to cover the engine and the like, a rear surface portion 9C extending diagonally upward from a rear portion of the operator's seat stand 9B, and a tank stand 9D provided to extend in the right-and-left direction at an upper portion of the rear surface portion 9C.

Figure 4:
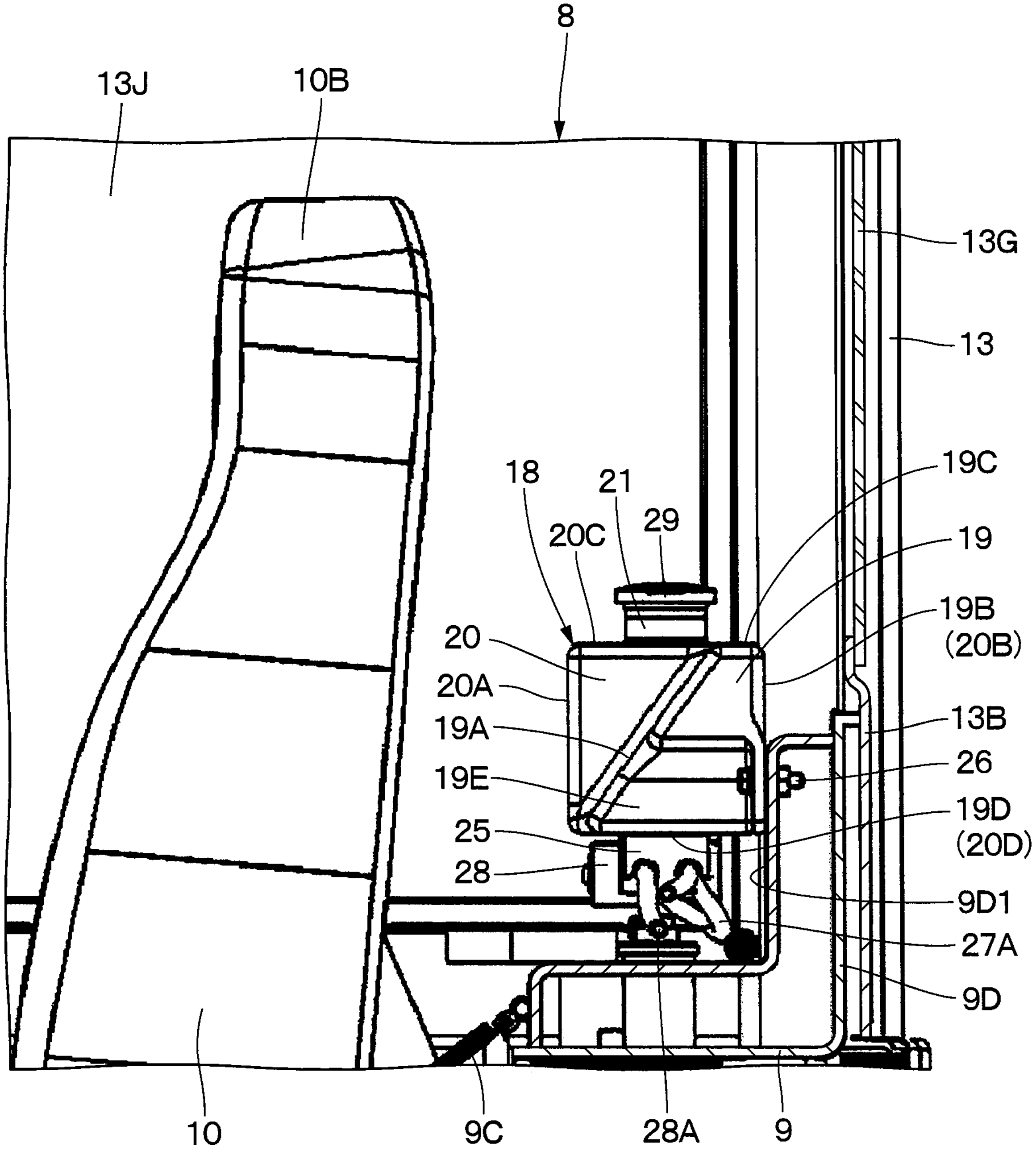
FIG. 4 is a cross-sectional view of the rear portion of the cab taken from arrow IV-IV of FIG. 3.

The operator's seat 10 and the like are mounted on the operator's seat stand 9B. The tank stand 9D is located immediately in front of a rear surface portion 13B of a later-described cab box 13, and also serves as a platform mounting a washer tank 18. As shown in FIG. 4, for example, the tank stand 9D is composed of an L-shaped structure extending from the upper portion to a rear side of the rear surface portion 9C and then rising up at a rear portion thereof, and the washer tank 18 is mounted at a vertical surface portion 9D1 on the rear side. In addition, a cab box 13 is mounted on the periphery of the floor member 9.

Figure 5:
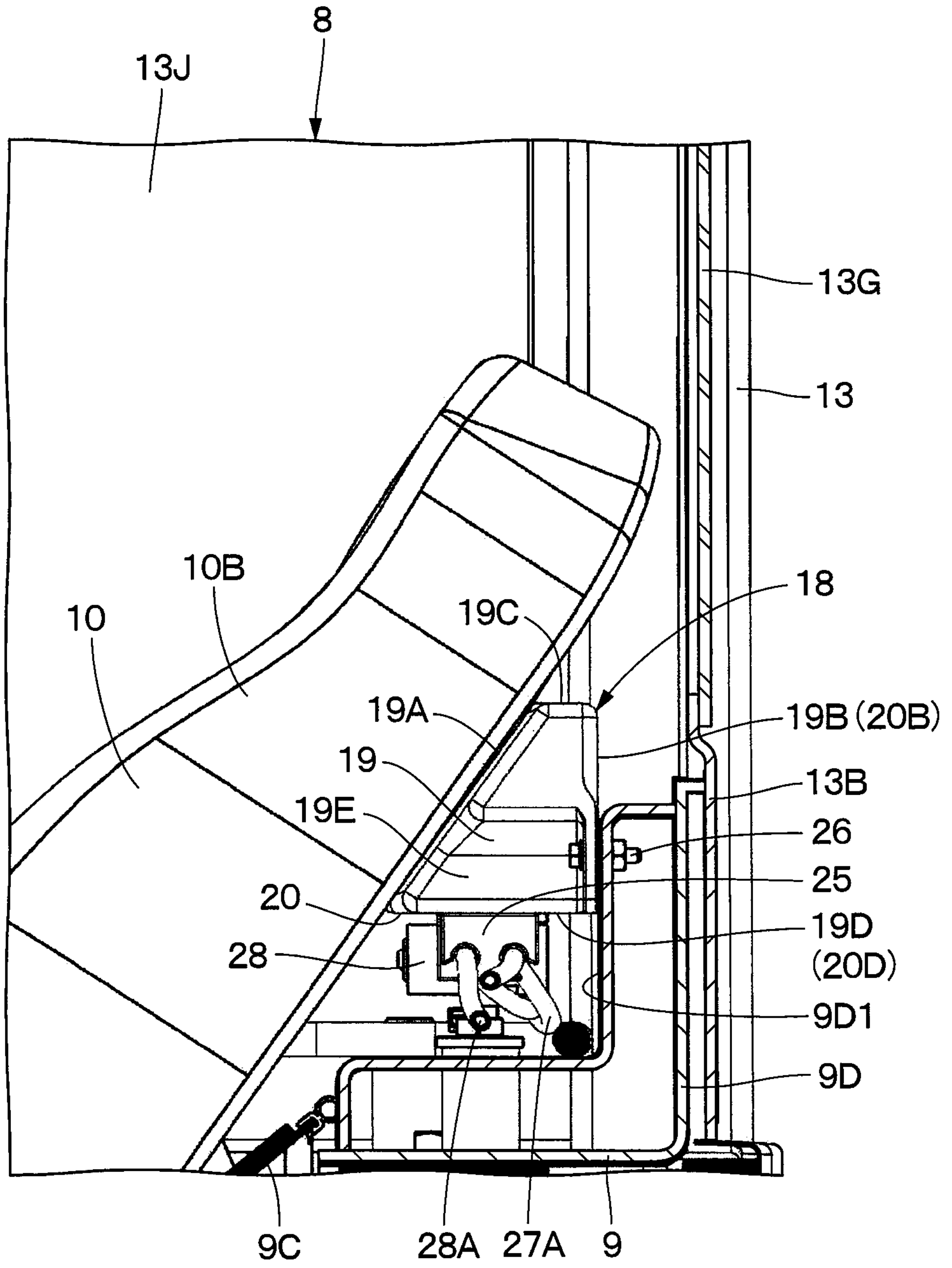
FIG. 5 is a cross-sectional view of the rear portion of the cab, with a backrest of an operator's seat reclined, viewed from the same position as in FIG. 4.

The operator's seat 10 is provided on the operator's seat stand 9B of the floor member 9. The operator's seat 10 includes a seating surface 10A for an on-board operator to sit on and a backrest 10B rising up from a rear side of the seating surface 10A. The backrest 10B has an adjustable fixing angle in the front-rear direction, depending on the operator's body shape and preferences. Specifically, as shown in FIG. 5, the backrest 10B is rotated rearward to the maximum to allow an upper end (head rest) to reach the vicinity of the rear surface portion 13B of the cab box 13.

A working lever device 11 is provided on either right or left side of the operator's seat 10. The working lever device 11 is operated by an operator to manipulate the working mechanism 4 and the like. A traveling lever/pedal device 12 is provided on a front side of the foot placing portion 9A of the floor member 9. The traveling lever/pedal device 12 is operated by an operator to allow the lower traveling structure 2 to travel.

The cab box 13 is provided on an upper side of the floor member 9. The cab box 13 forms an outer shell of the cab 8 and an operator's room therein. The cab box 13 is formed in the form of a box by a front surface portion 13A, a rear surface portion 13B, a left surface portion 13C, a right surface portion 13D and a top surface portion 13E.

The cab box 13 has a front window 13F at the front surface portion 13A, a rear window 13G at the rear surface portion 13B, a left window 13H at the left surface portion 13C, a right window 13J at the right surface portion 13D, and a top window (not shown) at the top surface portion 13E. Further, the cab box 13 includes a door 13K opening and closing an entrance way on a front side of the left surface portion 13C.

The front window 13F, the rear window 13G, the left window 13H, the right window 13J and the like are formed of a transparent window glass. The front window 13F is provided over the entire height of the cab box 13. Meanwhile, the rear window 13G, the left window 13H and the right window 13J are provided upward from an intermediate portion in the vertical direction of the cab box 13.

Herein, the rear window 13G of the rear surface portion 13B, and rear sides of the left window 13H of the left surface portion 13C and the right window 13J of the right surface portion 13D are provided upward from the tank stand 9D of the floor member 9. Thus, it is hard to visually check the position of a liquid level L1, L2 of a washer liquid in the washer tank 18 mounted on the tank stand 9D in the lateral direction.

As shown in FIG. 2, the front wiper device 14 is provided on the left side of the front window 13F. The front wiper device 14 removes water droplets attached to the front window 13F (window glass), for example, rain water, muddy water and the like. The rear wiper device 15 is provided on the right side of the rear window 13G. The rear wiper device 15 removes water droplets attached to the rear window 13G. The front wiper device 14 and the rear wiper device 15 constitute a wiper device. A top wiper device removing water droplets attached to the top window can be provided, in addition to the front wiper device 14 and the rear wiper device 15.

The front ejection device 16 is provided at a right upper portion of the front window 13F. The front ejection device 16 spurts a washer liquid pumped from the washer tank 18 onto the front window 13F (window glass). The rear ejection device 17 is provided at a left upper portion of the rear window 13G. The rear ejection device 17 spurts a washer liquid onto the rear window 13G (window glass). The front ejection device 16 and the rear ejection device 17 constitute an ejection device.

The front ejection device 16 is connected to the washer tank 18 via a later-described front pump 27 (hose 27A). The rear ejection device 17 is connected to the washer tank 18 via a rear pump 28 (hose 28A). A top ejection device spurting a washer liquid onto the top window can be provided, in addition to the front ejection device 16 and the rear ejection device 17.

Next, the configuration of the washer tank that constitutes the characterizing portion of an embodiment of the present invention, and operations of inspecting and filling a washer liquid will be described.

The washer tank 18 is a container storing a washer liquid to be supplied to the front ejection device 16 and the rear ejection device 17. The washer tank 18 is formed, for example, as a transparent or translucent container composed of a resin material. The washer tank 18 is disposed between the backrest 10B and the rear surface portion 13B of the cab box 13 at a position lower than an upper end of the backrest 10B, with the backrest 10B of the operator's seat 10 located at a predetermined angle (with the backrest 10B of the operator's seat 10 located to be generally perpendicular to the seating surface 10A), such that an operator can be seated on the seating surface 10A of the operator's seat 10. Specifically, the washer tank 18 is located on the tank stand 9D of the floor member 9 and mounted at the vertical surface portion 9D1.

Herein, the reason why the washer tank 18 is disposed between the backrest 10B of the operator's seat 10 and the rear surface portion 13B of the cab box 13 will be described. First, the lever devices 11, switches, monitors, lamps and so on must be located such that an operator seated on the operator's seat 10 can visually check each state and operate the machine. Accordingly, the lever devices 11, the switches, monitors, lamps and so on are disposed on either right or left side of the operator's seat 10. In this case, since the lever devices 11, switches and so on are disposed on either right or left side of the operator's seat 10 in the cab 8 of the small hydraulic excavator 1, typically formed in the form of a small box, it is difficult to provide a space installing a washer tank 18.

Meanwhile, the washer tank 18 can be installed in a space for reclining rearward the backrest 10B of the operator's seat 10. However, when the washer tank 18 is installed on a rear side of the operator's seat 10, it must be located at a position lower than the rear window 13G so as not to shield the rear window 13G.

In this case, in the cab 8 having a limited space, it is difficult to visually confirm the remaining amount (liquid level position) of a washer liquid in the washer tank 18 in the lateral direction. In contrast, the washer tank 18 according to this embodiment allows the operator to visually confirm the remaining amount of the washer liquid from above.

The washer tank 18 is formed as a laterally long container extending between the backrest 10B of the operator's seat 10 and the rear surface portion 13B of the cab box 13 in the right-and-left direction. The washer tank 18 includes a first container part 19 disposed at a left position to overlap with the backrest 10B in the front-rear direction and a second container part 20 provided on the right side to be continuous with the first container part 19.

The first container part 19 is provided to cover the range of about two-thirds of a dimension from an intermediate portion to a left end portion in the length dimension of the washer tank 18 in the right-and-left direction. The first container part 19 has an inclined surface 19A on a front side thereof, a rear surface 19B, a top surface 19C, a bottom surface 19D, and a left surface 19E, and is formed as a laterally long container having a trapezoid-shaped cross section perpendicular to the right-and-left direction. The rear surface 19B is flush with a rear surface 20B of the second container part 20, the top surface 19C is flush with a top surface 20C of the second container part 20, and the bottom surface 19D is flush with a bottom surface 20D of the second container part 20.

The inclined surface 19A inclines from the bottom surface 19D to the top surface 19C. Specifically, the inclined surface 19A is formed as a rectangular plane that inclines rearward from a front end edge of the bottom surface 19D toward a front end edge of the top surface 19C. Accordingly, the top surface 19C is elongated, and the first container part 19 may also be a laterally long container having a triangle-shaped cross section (in the form of a right triangle).

Figure 7:
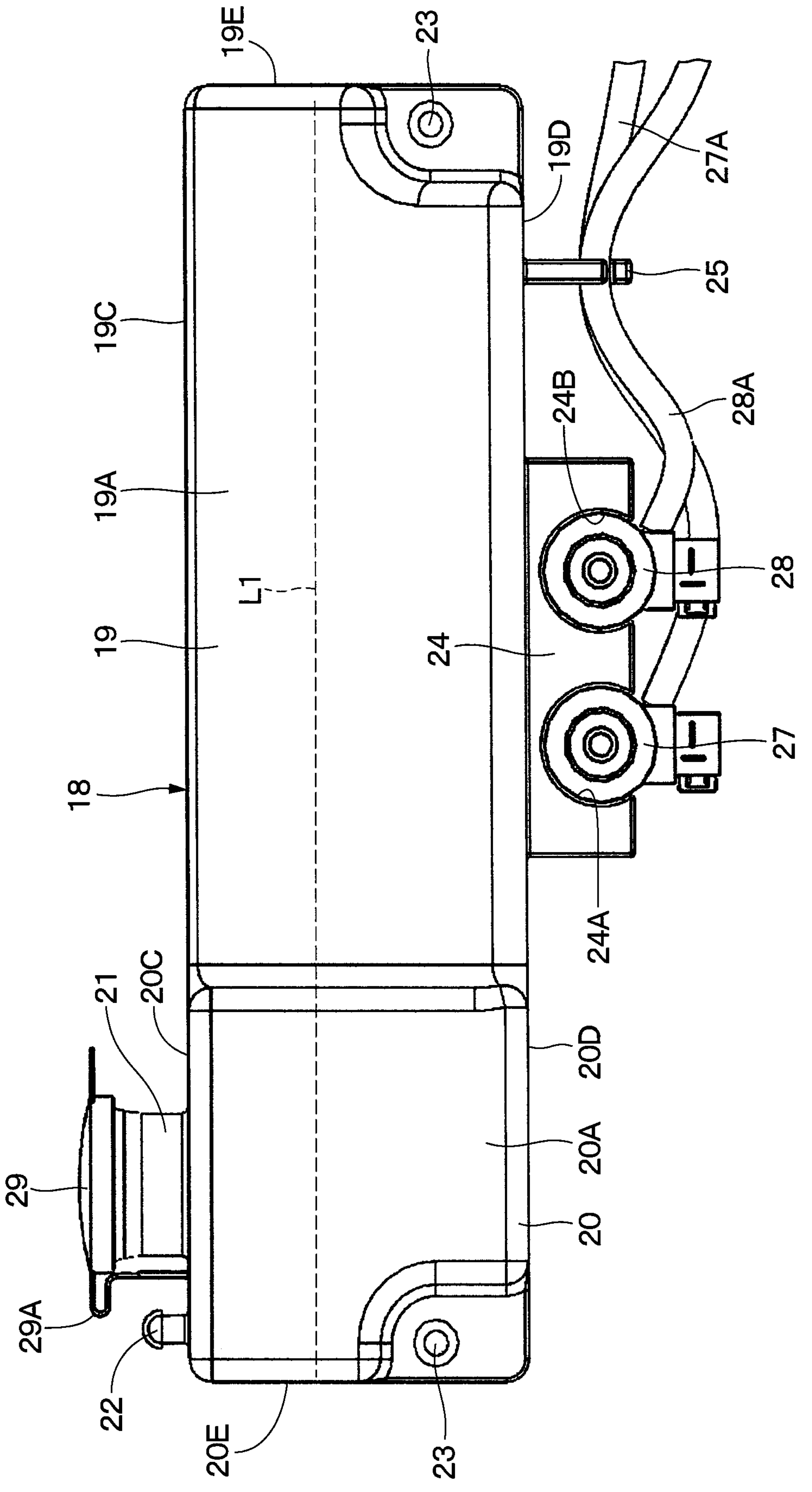
FIG. 7 is an anterior view of the washer tank to which the pumps and the hoses are attached.
Figure 8:
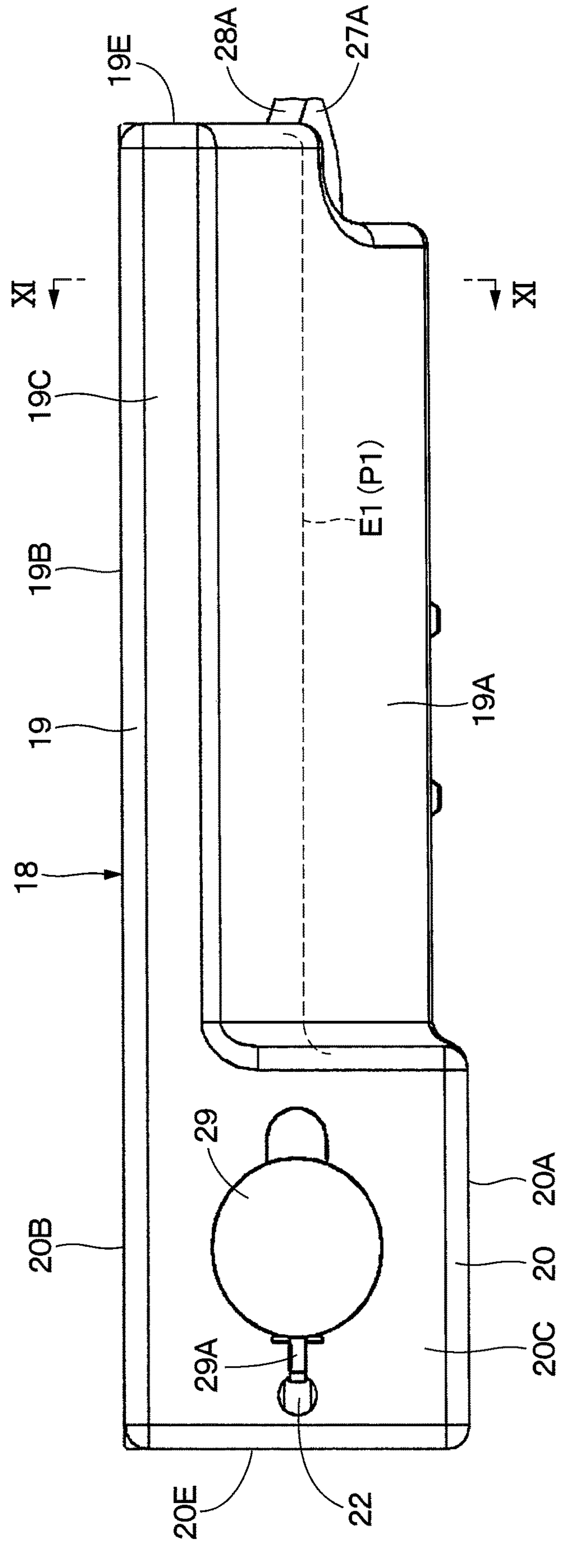
FIG. 8 is a plan view of the washer tank to which the pumps and the hoses are attached.
Figure 9:
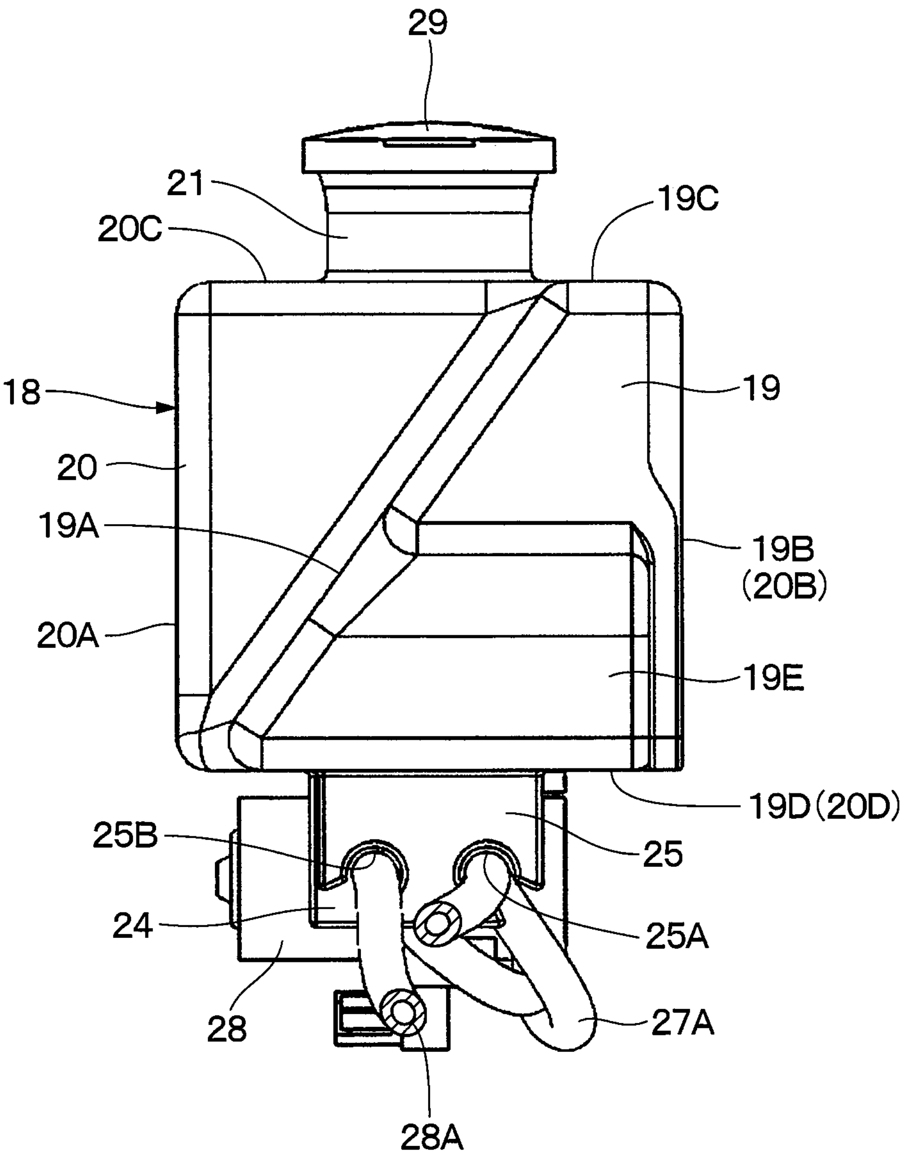
FIG. 9 is a left side view of the washer tank to which the pumps and the hoses are attached.

Herein, the inclined surface 19A inclines rearward from the front end edge of the bottom surface 19D toward the front end edge of the top surface 19C. In this configuration, the inclined surface 19A as part of the washer tank 18 is transparent or translucent. Therefore, the remaining amount of a washer liquid in the washer tank 18 viewed from the front side (in the lateral direction), that is, a liquid level L1 shown by a dotted line, as shown in FIG. 7, corresponding to a front end edge position P1 of the liquid level L1 in the washer tank 18 viewed from above (as shown in FIG. 11 as a position where the liquid level L1 is in contact with the inclined surface 19A), as shown in FIG. 8, can be visually confirmed as a remaining amount E1 (dotted line).

Figure 11:
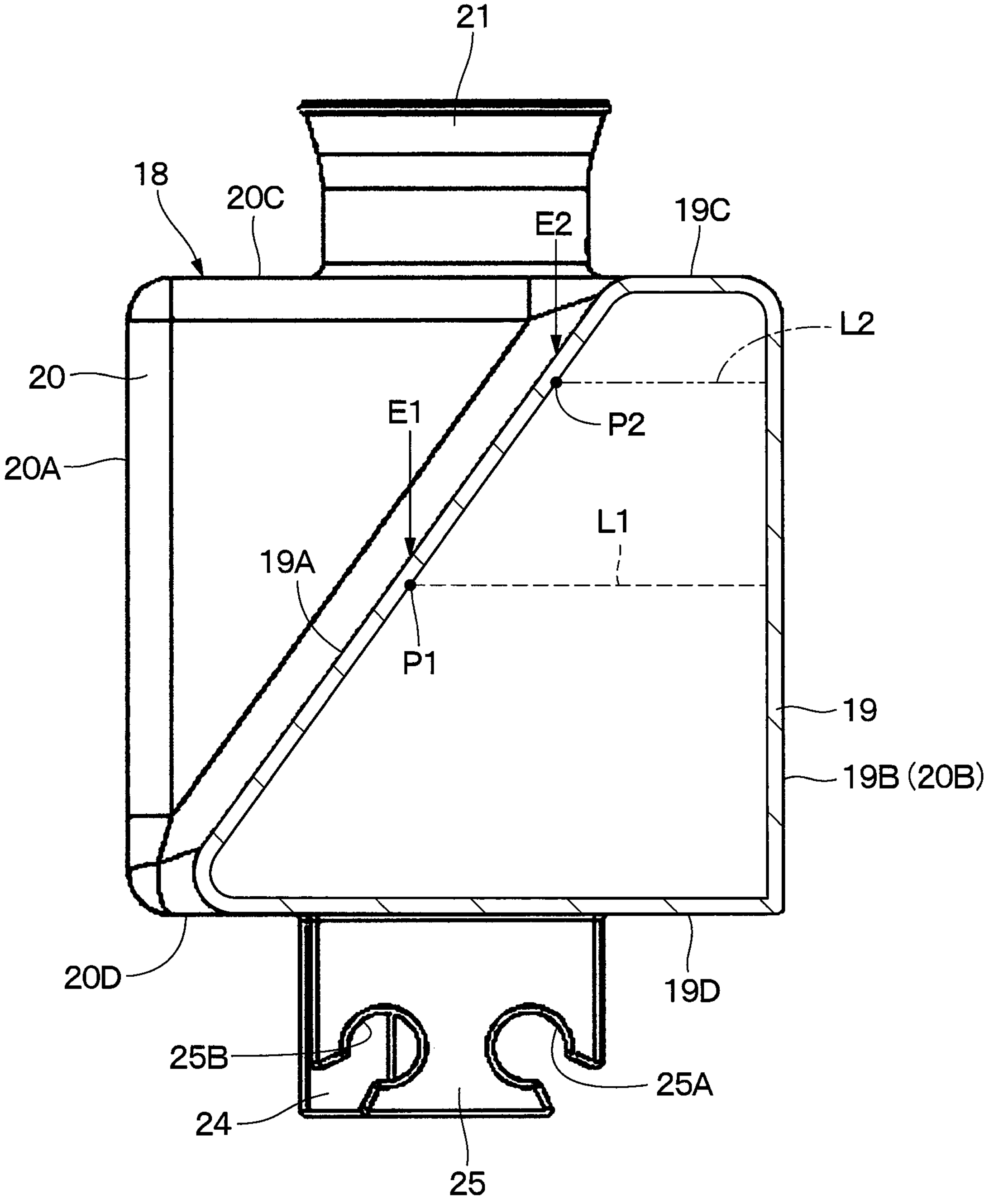
FIG. 11 is a cross-sectional view of the washer tank taken from arrow XI-XI of FIG. 8.

With a large remaining amount of a washer liquid as a high liquid level L2 shown by a two-dot chain line as shown in FIG. 11, a position P2 where a front end edge of the liquid level L2 is in contact with the inclined surface 19A can be visually confirmed as a remaining amount E2 in the washer tank 18 viewed from above.

As a result, the front end edge P1, P2 of the liquid level L1, L2 shown on the inclined surface 19A is located differently in the front-rear direction as the remaining amount E1, E2. Therefore, a front end edge of the liquid level (remaining amount) that is present closer to a front side of the inclined surface 19A in the washer tank 18 viewed from above means that the remaining amount is small. Meanwhile, a front end edge of the liquid level (remaining amount) that is present closer to a rear side of the inclined surface 19A means that the remaining amount is large. That is, the remaining amount of the washer liquid can readily be checked only by viewing the washer tank 18 from above.

The inclined surface 19A is disposed at a position to overlap with the backrest 10B of the operator's seat 10 in the front-rear direction, thereby allowing the inclined surface 19A to avoid interference with the backrest 10B reclined rearward, as shown in FIG. 5. In other words, a position defined by avoiding interference with the backrest 10B can effectively be utilized, and the capacity of the washer tank 18 can be larger in a limited space. Herein, the angle of allowing the backrest 10B to rotate rearward (incline rearward) to the maximum varies, depending on the forward-reverse position of the operator's seat 10 when the operator's seat 10 has a function capable of moving in the front-rear direction, and the tilting angle of the inclined surface 19A is determined along a rear surface of the backrest 10B, with the backrest 10B rotated rearward to the maximum. In this regard, the capacity of the washer tank 18 can be larger and the rear tilting angle of the backrest 10B can be large to widen the range corresponding to the sit-down posture of the operator.

Further, the inclined surface 19A provided for the washer tank 18 keeps a less washer liquid at a higher position in the washer tank 18. Accordingly, reduction in waves of a washer liquid generated by the washer tank 18 to swing advantageously lower loads upon the waves colliding with an inner wall.

The second container part 20 is provided to cover the range of about one-third of a dimension on the right side in the length dimension of the washer tank 18 in the right-and-left direction. The second container part 20 has a front surface 20A, the rear surface 20B, the top surface 20C, the bottom surface 20D, and a right surface 20E, and is formed as a container having a rectangular-shaped cross section perpendicular to the right-and-left direction. The second container part 20 is provided to be continuous with the right side of the first container part 19. The rear surface 20B is flush with the rear surface 19B of the first container part 19, the top surface 20C is flush with the top surface 19C of the first container part 19, and the bottom surface 20D is flush with the bottom surface 19D of the first container part 19.

The washer tank 18 has an increased capacity of a washer liquid to be filled by forming a rectangular parallelepiped-shaped second container part 20. Also, the top surface 20C can be formed to be flat from the front surface 20A to the rear surface 20B. As a result, a large (large-bore) filling port 21 can be provided on the top surface 20C.

The filling port 21 is provided to project upward from the top surface 20C of the second container part 20. The filling port 21 is formed to have a large bore as described above, thereby facilitating filling of a washer liquid. A cap hook 22 is located near the filling port 21 and provided on the top surface 20C. A belt 29A of a later-described cap 29 is fastened to the cap hook 22.

A bolt through hole 23 is provided through the washer tank 18 to penetrate in the front-rear direction on the left side of the first container part 19 and on the right side of the second container part 20. Later-described bolts 26 are inserted into two bolt through holes 23. A motor bracket 24 is provided to be located at the center in the right-and-left direction on the bottom surface 19D of the first container part 19, and a hose bracket 25 is provided to be located on the left side.

Figure 10:
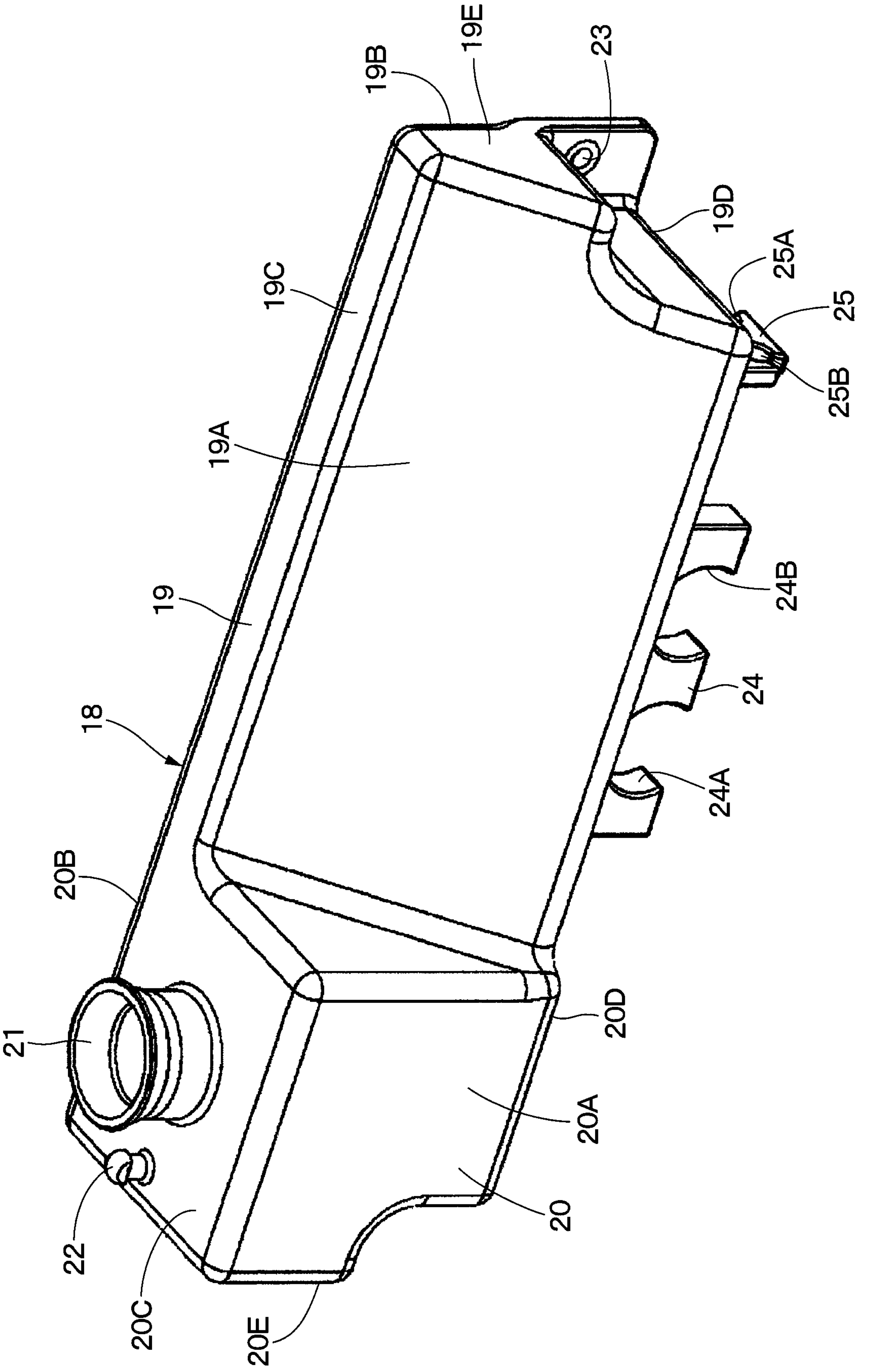
FIG. 10 is a perspective view of a single washer tank.

The motor bracket 24 holds a later-described front pump 27 and a rear pump 28. As shown in FIG. 7, the motor bracket 24 is composed of a rectangular plate extending in the right-and-left direction, and an upper end edge thereof is secured to the bottom surface 19D of the first container part 19. As shown in FIG. 10, the motor bracket 24 has C-shaped notches 24A, 24B that are open downward in parallel in the right-and-left direction. A front pump 27 is fitted to the notch 24A using elastic forces. A rear pump 28 is fitted to the notch 24B using elastic forces.

The hose bracket 25 holds a hose 27A of the front pump 27 and a hose 28A of the rear pump 28. As shown in FIG. 11, the hose bracket 25 is composed of a rectangular plate extending in the front-rear direction, and an upper end edge thereof is secured to the bottom surface 19D of the first container part 19. The hose bracket 25 has C-shaped notches 25A, 25B that are open diagonally downward in parallel in the right-and-left direction. The hose 27A of the front pump 27 is fitted to the notch 25A using elastic forces. The hose 28A of the rear pump 28 is fitted to the notch 25B using elastic forces.

Figure 3:
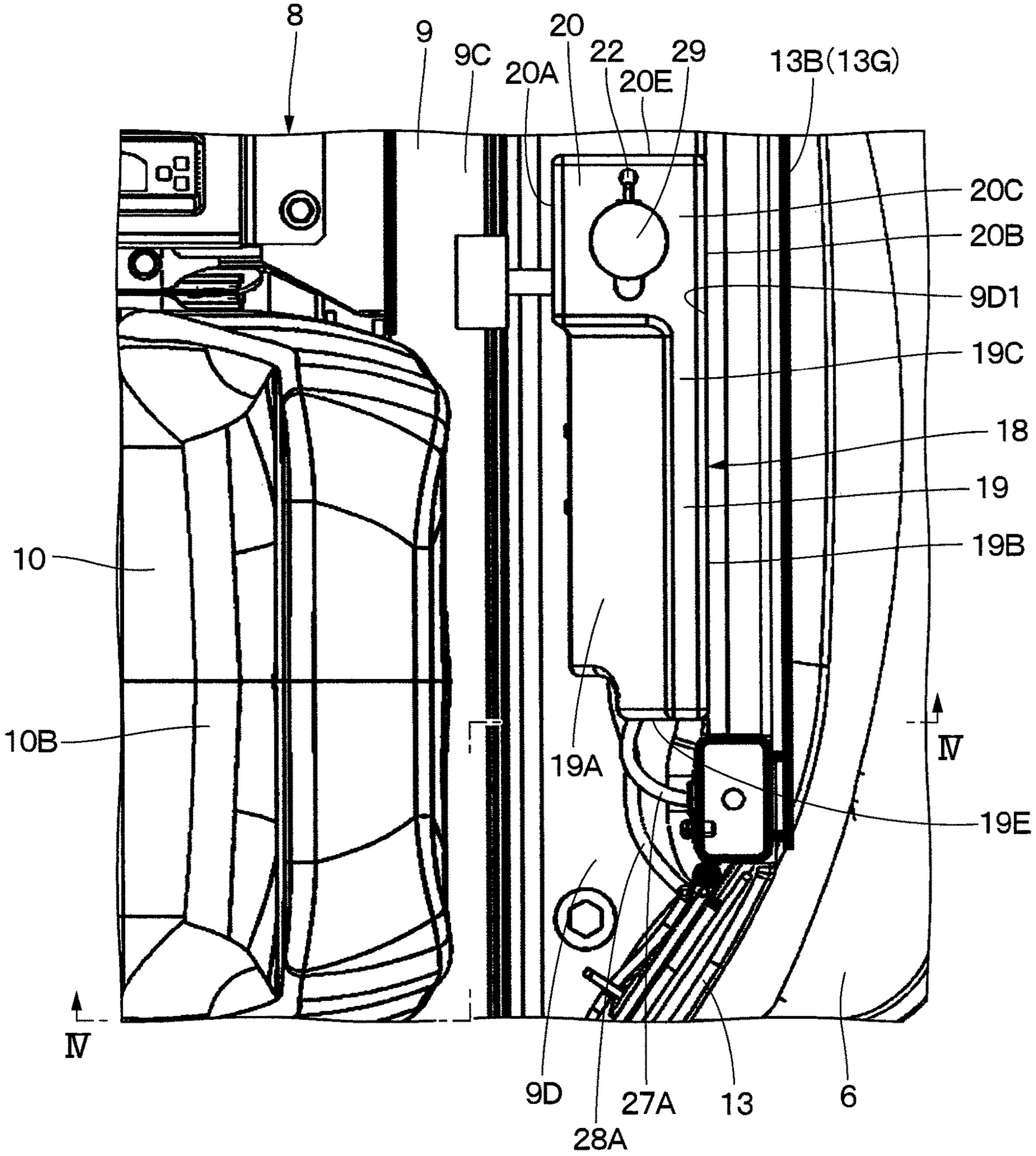
FIG. 3 is a cross-sectional view showing an enlarged rear portion of a cab in FIG. 2.

As shown in FIGS. 3 to 5, the washer tank 18 is configured to allow the rear surface 19B of the first container part 19 and the rear surface 20B of the second container part 20 to abut to each other at a predetermined position of the vertical surface portion 9D1 that constitutes the tank stand 9D of the floor member 9 (a rear side of the backrest 10B of the operator's seat 10). In this state, bolts 26 inserted into two bolt through holes 23 can be screwed into the tank stand 9D to dispose the washer tank 18 between the backrest 10B and the rear surface portion 13B of the cab box 13 (cab 8) at a position lower than the backrest 10B.

Figure 6:
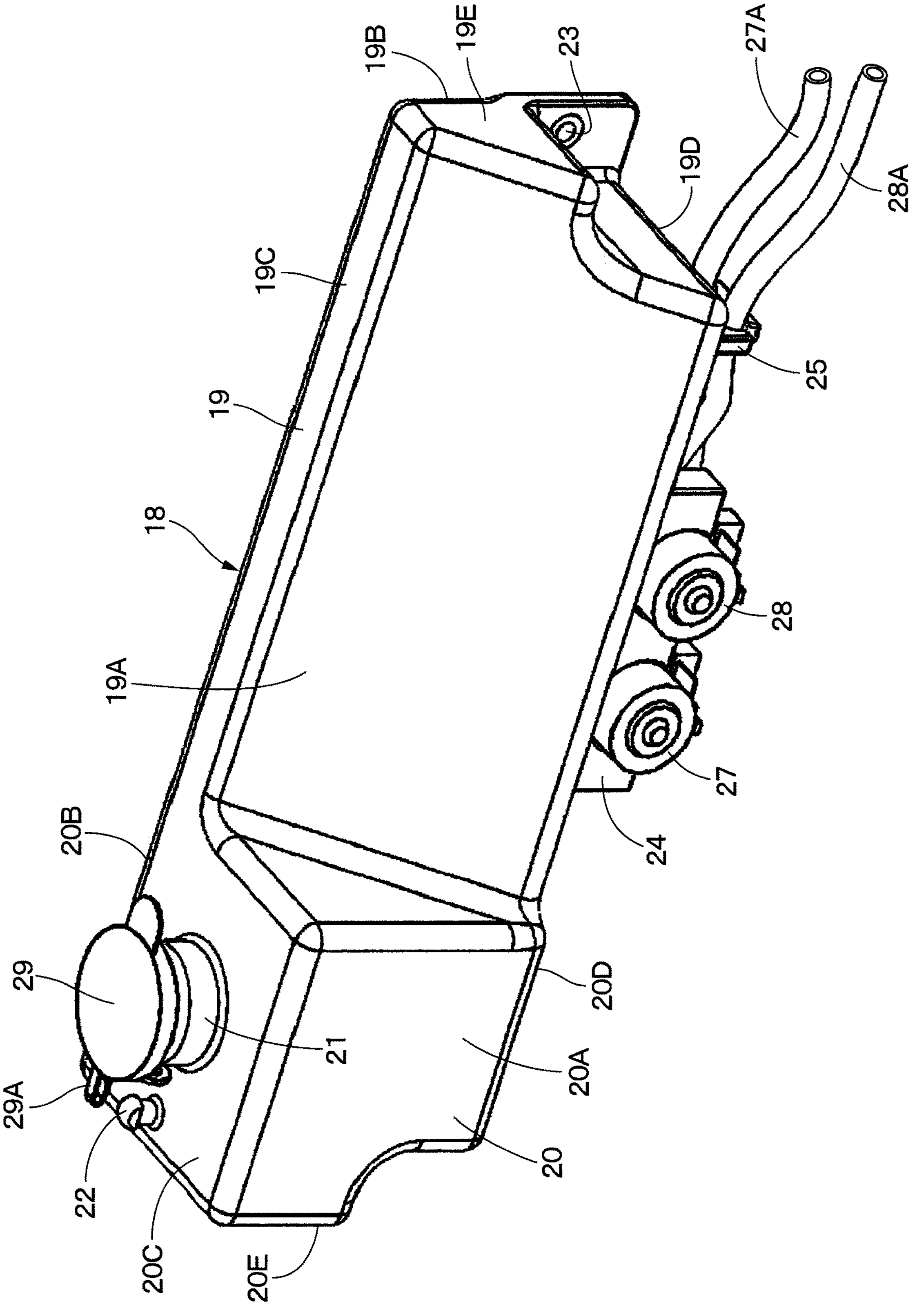
FIG. 6 is a perspective view of a washer tank to which pumps and hoses are attached.

As shown in FIGS. 6 and 7, the front pump 27 is mounted to be fitted to the notch 24A of the motor bracket 24 of the washer tank 18. The front pump 27 includes a pump portion and a motor portion, and the hose 27A extending from the pump portion is connected to the front ejection device 16. The hose 27A has a midway portion fitted to the notch 25A of the hose bracket 25.

The rear pump 28 is mounted to be fitted to the notch 24B of the motor bracket 24. The rear pump 28 includes a pump portion and a motor portion, and the hose 28A extending from the pump portion is connected to the rear ejection device 17. The hose 28A has a midway portion fitted to the notch 25B of the hose bracket 25.

A cap 29 is detachable from the filling port 21 of the washer tank 18. The cap 29 can be mounted to the filling port 21 to close the filling port 21. Meanwhile, the cap 29 can be removed from the filling port 21 to open the filling port 21. With the filling port 21 open, a washer liquid can be filled through the filling port 21. The cap 29 has a belt 29A for preventing it from coming off or loss, and a tip of the belt 29A is fastened to the cap hook 22.

The hydraulic excavator 1 applied to this embodiment is configured as described above, and subsequently, the operation of the hydraulic excavator 1 will be explained.

First, an operator allows the lower traveling structure 2 to travel by riding on the cab 8, sitting on the operator's seat 10 and operating the traveling lever/pedal device 12. The operator can perform excavating work of earth and sand by operating the working lever device 11 to rotate the working mechanism 4.

Further, when the front window 13F of the cab box 13 is fouled with dust or muddy water, fouling on the front window 13F can be removed by turning ON a wiper switch (not shown) in the cab 8 to operate the front wiper device 14. At this time, a washer switch (not shown) is turned ON to activate the front pump 27 and spurt the washer liquid in the washer tank 18 from the front ejection device 16 onto the front window 13F. As a result, firmly-attached fouling can be dissolved with the washer liquid and efficiently removed by the front wiper device 14. Similarly, fouling on the rear window 13G can also be removed by the rear wiper device 15 and the rear ejection device 17.

Next, each type of inspection operation performed in the hydraulic excavator 1, for example, an operation of inspecting the remaining amount of a washer liquid of the washer tank 18 and an operation of filling a washer liquid to the washer tank 18 will be described.

In the operation of inspecting the remaining amount of a washer liquid, an operator seated in a cab 8 peers into the rear side of the backrest 10B of the operator's seat 10 to visually confirm the washer tank 18 from above. When the washer tank 18 is visually confirmed from above, a front end edge P1, P2 of a liquid level L1, L2 of a washer liquid is shown on the transparent inclined surface 19A of the first container part 19. At this time, the position of the front end edge P1, P2 moves in the front-rear direction, depending on the height of the liquid level L1, L2. Therefore, it is found that the remaining amount E1 of a washer liquid is low (liquid level L1 is low), with the front end edge P1 of the liquid level L1 viewed closer to the front side of the inclined surface 19A in the washer tank 18 visually confirmed from above. Conversely, it is found that the remaining amount E2 is high (liquid level L2 is high), with the front end edge P2 of the liquid level L2 viewed closer to the rear side of the inclined surface 19A. That is, the remaining amount E1, E2 of the washer liquid can readily be checked only by viewing the washer tank 18 from above.

In the operation of inspecting the remaining amount E1, E2 of the washer liquid, a washer liquid will be filled upon finding a lower remaining amount of the washer liquid in the washer tank 18. First, the cap 29 is removed to open the filling port 21. In this state, a washer liquid is filled (supplemented) from the filling port 21. The filling of the washer liquid should be stopped when the liquid level comes closer to the top surface 19C while checking a rearward movement of the front end edge of the liquid level shown on the inclined surface 19A. As a result, a washer liquid can swiftly be filled without any overflow. Once the washer liquid is filled, the cap 29 should be mounted on the filling port 21.

According to this embodiment, the washer tank 18 storing a washer liquid to be supplied to the front ejection device 16 and the rear ejection device 17 is composed of a transparent or translucent container, and includes the inclined surface 19A that inclines from the bottom surface 19D to the top surface 19C of the first container part 19. Therefore, when the height of the liquid level L1, L2 of the washer liquid varies in the washer tank 18, the front end edge P1, P2 of the liquid level L1, L2 moves in the front-rear direction along the inclined surface 19A. This property allows the operator to confirm the remaining amount E1, E2 of the washer liquid only by checking the position of the front end edge P1, P2 of the liquid level L1, L2 shown on the inclined surface 19A of the first container part 19 from above.

Consequently, as shown in the cab 8 of the small hydraulic excavator 1, the operator can readily check the remaining amount of a washer liquid (liquid level height position) in the washer tank 18 and improve the efficiency of inspecting and filling operations even when the washer tank 18 is disposed in a work site where it is hard to visually confirm the washer liquid level in the lateral direction. In the operation of filling a washer liquid from above, the progress of filling can readily be determined only by visually confirming the washer tank 18 from above and overflow of a washer liquid can be prevented beforehand.

The operator's seat 10 for an on-board operator is provided in the cab 8. The washer tank 18 is disposed between the backrest 10B and the rear surface portion 13B of the cab box 13 that constitutes the cab 8 at a position lower than the upper end of the backrest 10B of the operator's seat 10 (head rest). As a result, the washer tank 18 can be disposed at a position on the rear side of the operator's seat 10 that is a dead space in the cab 8. Also, the washer tank 18 located lower than the upper end of the backrest 10B can provide the operator with a wide rear view due to no obstacle to the view.

The washer tank 18 is formed as a laterally long container extending in the right-and-left direction. The inclined surface 19A is defined on a front surface of the washer tank 18 and disposed at a position to overlap with the backrest 10B in the front-rear direction. As a result, the inclined surface 19A can avoid interference with the backrest 10B reclined rearward. In other words, the position where the backrest 10B is not interfered can effectively be utilized, and the capacity of the washer tank 18 can be large in a limited space. Further, the rear inclined angle of the backrest 10B can be large to widen the range that can correspond to the preferred sit-down posture of an operator.

The washer tank 18 includes the first container part 19 having the inclined surface 19A and the second container part 20 provided to be continuous with the first container part 19. The first container part 19 has a trapezoid-shaped or triangle-shaped cross section perpendicular to the right-and-left direction, and the second container part 20 has a flat top surface 20C from the front surface 20A to the rear surface 20B, and has a rectangular-shaped cross section perpendicular to the right-and-left direction. The filling port 21 for filling a washer liquid is provided on the top surface 20C of the second container part 20. Therefore, the large (large-bore) filling port 21 can be provided on the flat top surface 20C to efficiently perform a filling operation of a washer liquid.

In an embodiment, the case where a second container part 20 is provided on the right side of a first container part 19 was illustrated. However, the present invention is not limited to that, and a second container part may be provided on the left side of a first container part. A second container part may also be provided on both right and left side of a first container part. Further, a second container part can be omitted and only a first container part may be employed.

In the embodiment, the case where a washer tank 18 is disposed between a backrest 10B of an operator's seat 10 and a rear surface portion 13B of a cab box 13 that constitutes a cab 8 was illustrated. However, the present invention is not limited to this configuration, and a washer tank 18 is effectively located in a cab 8 such that the washer liquid level cannot be visually confirmed in the lateral direction, not necessarily on a rear side of an operator's seat 10. That is, a washer tank may be located not right behind a backrest of an operator's seat, but on a rear side from the backrest and on the left or right side off the backrest. Alternatively, a washer tank may be disposed on a floor member next to an operator's seat (working lever device).

The embodiments are explained by taking the example where a crawler-type hydraulic excavator 1 is illustrated as a construction machine. However, the present invention is not limited to that, and it may be employed in, for example, a wheel-type hydraulic excavator with a cab. In addition, such excavators can widely be used for other types of construction machines with a cab such as a wheel loader.

DESCRIPTION OF REFERENCE NUMERALS

1: Hydraulic excavator (Construction machine)
2 Lower traveling structure (Vehicle body)
3: Upper revolving structure (Vehicle body)
8: Cab
10: Operator's seat
10B: Backrest
13: Cab box
13B: Rear surface portion
13F: Front window (Window)
13G: Rear window (Window)
13H: Left window (Window)
13J: Right window (Window)
16: Front ejection device (Ejection device)
17: Rear ejection device (Ejection device)
18: Washer tank
19: First container part
19A: Inclined surface
19C, 20C: Top surface
19D: Bottom surface
20: Second container part
20A: Front surface
20B: Rear surface
21: Filling port

The invention claimed is:

1. A construction machine comprising: a self-propelled vehicle body; and a cab provided on the vehicle body and having a window, the cab comprising: an ejection device spurting a washer liquid onto the window and a washer tank storing a washer liquid to be supplied to the ejection device, wherein the washer tank is composed of a transparent or translucent container and includes an inclined surface that inclines from a bottom surface to a top surface, an operator's seat is provided in the cab, wherein the washer tank is disposed between a backrest of the operator's seat and a rear surface portion of the cab at a position lower than an upper end of the backrest, the washer tank is formed as a laterally long container extending in the right-and-left direction of the machine, and the inclined surface is defined on a front surface of the washer tank and disposed at a position to overlap with the backrest in the front-rear direction of the machine.

2. The construction machine according to claim 1, wherein the washer tank comprises a first container part having the inclined surface and a second container part provided to be continuous with the first container part, wherein the first container part has a trapezoid-shaped or triangle-shaped cross section perpendicular to the right-and-left direction of the machine, and the second container part has the top surface that is flat from a front surface to a rear surface, and a rectangular-shaped cross section perpendicular to the right-and-left direction of the machine, wherein a filling port for filling a washer liquid is provided on the top surface of the second container part.

* * * * *